(12) United States Patent
Campbell

(10) Patent No.: US 10,631,548 B2
(45) Date of Patent: Apr. 28, 2020

(54) CARCASS PROCESSING SYSTEM AND METHOD

(71) Applicant: Scott Automation & Robotics Pty Ltd., Silverwater, New South Wales (NZ)

(72) Inventor: Clyde Campbell, Mosman (AU)

(73) Assignee: Scott Automation & Robotics Pty Ltd., Silverwater, New South Wales (AU)

( * ) Notice: Subject to any disclaimer, the term of this patent is extended or adjusted under 35 U.S.C. 154(b) by 0 days.

(21) Appl. No.: 16/348,670

(22) PCT Filed: Dec. 23, 2016

(86) PCT No.: PCT/AU2016/051279
§ 371 (c)(1),
(2) Date: May 9, 2019

(87) PCT Pub. No.: WO2018/085879
PCT Pub. Date: May 17, 2018

(65) Prior Publication Data
US 2019/0320666 A1    Oct. 24, 2019

(30) Foreign Application Priority Data
Nov. 9, 2016 (AU) .............................. 2016904561

(51) Int. Cl.
*A22B 5/00* (2006.01)
*A22B 7/00* (2006.01)
(Continued)

(52) U.S. Cl.
CPC ............ *A22B 5/007* (2013.01); *A22B 5/0041* (2013.01); *A22B 7/001* (2013.01);
(Continued)

(58) Field of Classification Search
CPC ....... A22B 5/00; A22B 5/0017; A22B 5/0029; A22B 5/0041; A22B 5/20; A22B 5/203;
(Continued)

(56) References Cited

U.S. PATENT DOCUMENTS 3,916,482 A * 11/1975 Kvilhaug ............... A22B 5/207
452/152
4,557,014 A * 12/1985 Vogt .................... G05B 19/4183
452/151
(Continued)

FOREIGN PATENT DOCUMENTS

| AU | 654294 B2 | 11/1994 |
|---|---|---|
| AU | 20122229596 | 4/2013 |
| EP | 2946667 A1 | 11/2015 |

OTHER PUBLICATIONS

International Search Report for International Application No. PCT/AU2016/051279 dated Mar. 27, 2017 (3 pages).
(Continued)

*Primary Examiner* — Richard T Price, Jr.
(74) *Attorney, Agent, or Firm* — Merchant & Gould P.C.

(57) ABSTRACT

A carcass cutting system including a belt positioned below a conveyor such as to stabilise a carcass during imaging and/or cutting operations. An offset section of conveyor track in the region of the belt may be utilized to urge the carcass against the belt. Imagining may use an optical imaging system, an X-ray imaging system, a laser scanning camera, a time of flight camera or a Dual-energy X-ray absorptiometry system. Imaging information may be used to calculate cutting paths and/or weight distribution of carcass portions. Cutting may be performed by a robotic cutter using a circular saw or a circular knife.

19 Claims, 4 Drawing Sheets

(51) Int. Cl.
*A22C 17/00* (2006.01)
*A22C 17/02* (2006.01)
*A22C 18/00* (2006.01)

(52) U.S. Cl.
CPC ...... *A22C 17/0006* (2013.01); *A22C 17/0073* (2013.01); *A22C 17/02* (2013.01); *A22C 18/00* (2013.01)

(58) Field of Classification Search
CPC ........... A22B 7/00; A22B 7/001; A22B 7/002; A22B 7/004
USPC ....... 452/149–153, 155, 156, 160, 163, 164, 452/167
See application file for complete search history.

(56) References Cited

U.S. PATENT DOCUMENTS

| | | | |
|---|---|---|---|
| 5,542,878 A * | 8/1996 | Sheedy | A22B 5/0035 452/135 |
| 6,334,811 B1 * | 1/2002 | Cremonini | A22B 5/0035 452/149 |
| 6,882,434 B1 * | 4/2005 | Sandberg | A22C 17/0033 250/223 R |
| 2004/0242141 A1 * | 12/2004 | Ono | A22B 5/0005 452/167 |
| 2007/0212995 A1 * | 9/2007 | Mammoto | A22B 5/0035 452/149 |
| 2007/0275648 A1 * | 11/2007 | Sato | A22B 5/0041 452/157 |
| 2007/0293132 A1 * | 12/2007 | Arnason | A22C 25/166 452/140 |
| 2009/0088058 A1 * | 4/2009 | Klein | A22B 5/206 452/153 |
| 2009/0124186 A1 * | 5/2009 | Klein | A22B 5/20 452/152 |
| 2009/0270021 A1 * | 10/2009 | Umino | A22C 17/004 452/136 |
| 2010/0304652 A1 * | 12/2010 | Bolte | A22C 17/002 452/157 |
| 2011/0275298 A1 | 11/2011 | De Vos et al. | |
| 2013/0288583 A1 * | 10/2013 | Van Hillo | A22C 21/0023 452/167 |
| 2015/0105027 A1 | 4/2015 | Mastio et al. | |
| 2015/0164095 A1 * | 6/2015 | Basso | A22B 7/003 452/149 |

OTHER PUBLICATIONS

International Written Opinion for International Application No. PCT/AU2016/051279 dated Mar. 27, 2017 (5 pages).

* cited by examiner

CARCASS PROCESSING SYSTEM AND METHOD

This application is a National Stage Application of PCT/AU2016/051279, filed 23 Dec. 2016, which claims benefit of Serial No. 2016904561, filed 9 Nov. 2016 in Australia and which applications are incorporated herein by reference. To the extent appropriate, a claim of priority is made to each of the above-disclosed applications.

FIELD

This invention relates to a carcass processing system and method for imaging and or performing cuts on a carcass. The method and system are particularly suited to processing of a carcass during its transportation along a conveyor.

BACKGROUND

In the meet processing industry much processing is performed whilst a carcass is conveyed along a conveyor line. For automated imaging and cutting steps it is often necessary to remove a carcass from the conveyor to stabilize the carcass for automated processing. This may involve placing the carcass on a trolley, holding the carcass using a robotic arm or placing the carcass on a flat conveyor. This requires additional handling and equipment and may make processing less efficient.

The difficulty with performing operations on a carcass moving on a conveyor is that the carcass my not remain in a stable frame of reference. Typically, a carcass will swing about its centerline. During imaging the movement of the carcass of the path of the conveyor may result in inaccurate or distorted imaging information being captured. The image information may indicate that the carcass is in a certain position with respect to the conveyor but due to swing this position may be different with respect to the conveyor at the cutting station.

During cutting swing of the carcass can present the cutting tool with a moving target to cut. This may also be out of alignment with the imaged information.

Further the force of the tool on the carcass may move the carcass away from its free hanging position.

These problems have resulted in automated carcass processing steps typically being performed with the carcass removed from the conveyor.

It is an object of the invention to provide a carcass processing system and method which stabilizes the carcass during processing on a conveyor or to at least provide the public with a useful choice.

SUMMARY

According to one example embodiment there is provided a carcass cutting system comprising:
 a. a conveyor for conveying a hanging carcass;
 b. a belt positioned below the conveyor such as to position a carcass away from its natural hanging position; and
 c. a cutting tool positioned to perform a cut whilst a carcass is against the belt.

According to another example embodiment there is provided a method of performing a cut on a carcass comprising the steps of:
 a. hanging a carcass on a conveyor;
 b. advancing the carcass along the conveyor against a belt moving in the direction of the conveyor which is positioned with respect to the conveyor such that the force of gravity on the carcass forces it against the belt; and
 c. performing a cut on the carcass whilst it is against the belt.

According to a further example embodiment there is provided a carcass imaging system comprising:
 a. a conveyor for conveying a hanging carcass;
 b. a belt positioned below the conveyor such as to position a carcass away from its natural hanging position; and
 c. an imaging device positioned to image the carcass whilst it is against the belt.

According to another example embodiment there is provided a method of imaging a carcass comprising the steps of:
 a. hanging a carcass on a conveyor;
 b. advancing the carcass along the conveyor against a belt moving in the direction of the conveyor which is positioned with respect to the conveyor such that the force of gravity on the carcass forces it against the belt; and
 c. imaging the carcass whilst it is against the belt.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which.

DETAILED DESCRIPTION

Figure 1:
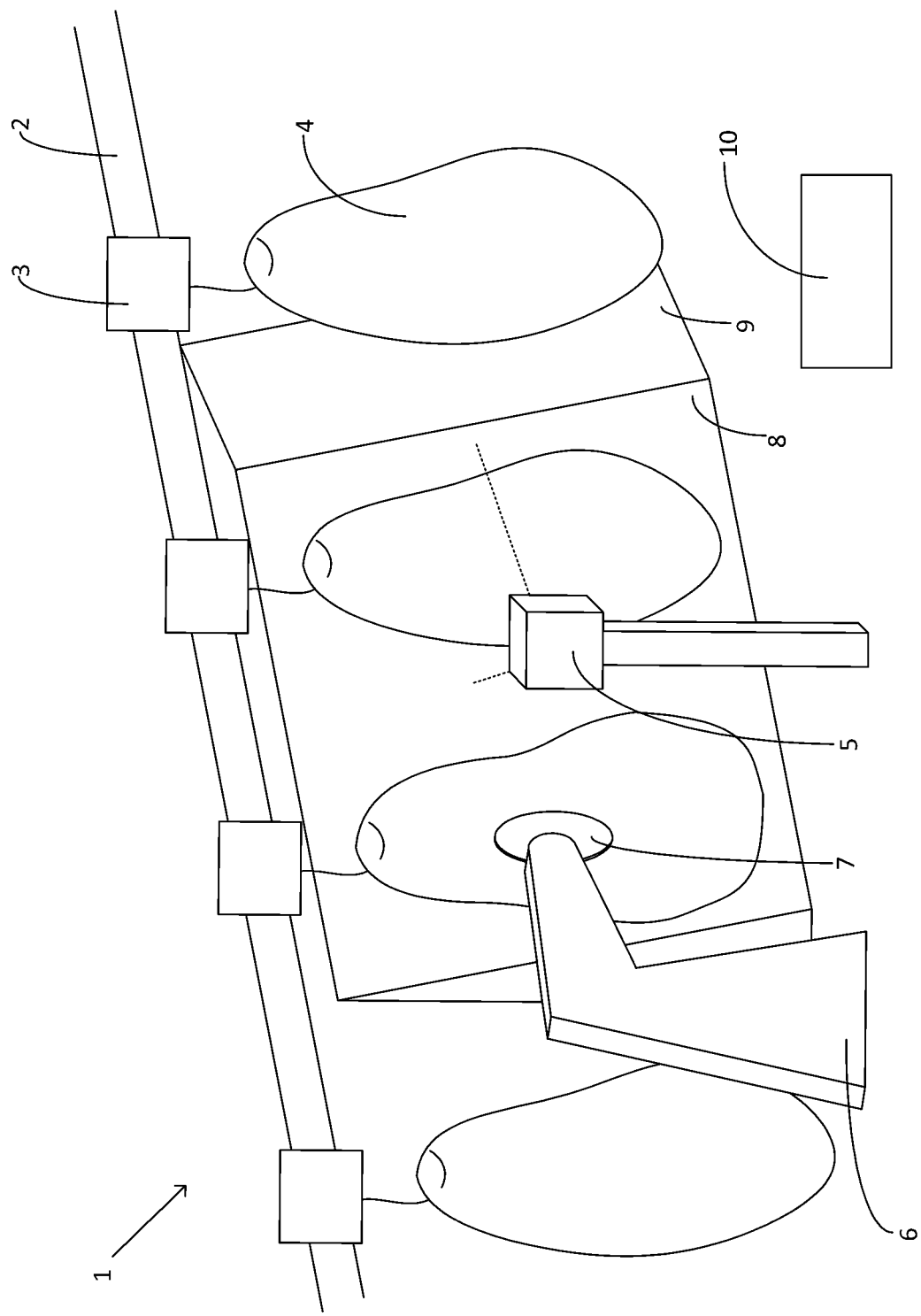
FIG. 1 is a schematic perspective view of a carcass processing system.

FIG. 1 shows an exemplary carcass processing system 1 in which carcasses 4 hang by hooks from pulleys 3 and are conveyed along conveyor rail 2. Carcasses are advanced along the conveyor from right to left so that they pass in front of imaging device 5 for imaging prior to passing in front of cutting tool 6.

In the region of the conveyor adjacent the imaging device 5 and cutting tool 6 a belt 8 is provided. Belt 8 is in the form of a continuous loop belt (only shown schematically) driven from right to left. The belt may suitably be between 200 to 3000 mm in width. Belt 8 may be in the form of a number of rigid hinged sections or a flexible material. Belt 8 may be driven at a continuous speed by a motor or the motor may be controllable to stop and start the belt as described below.

Figure 2:
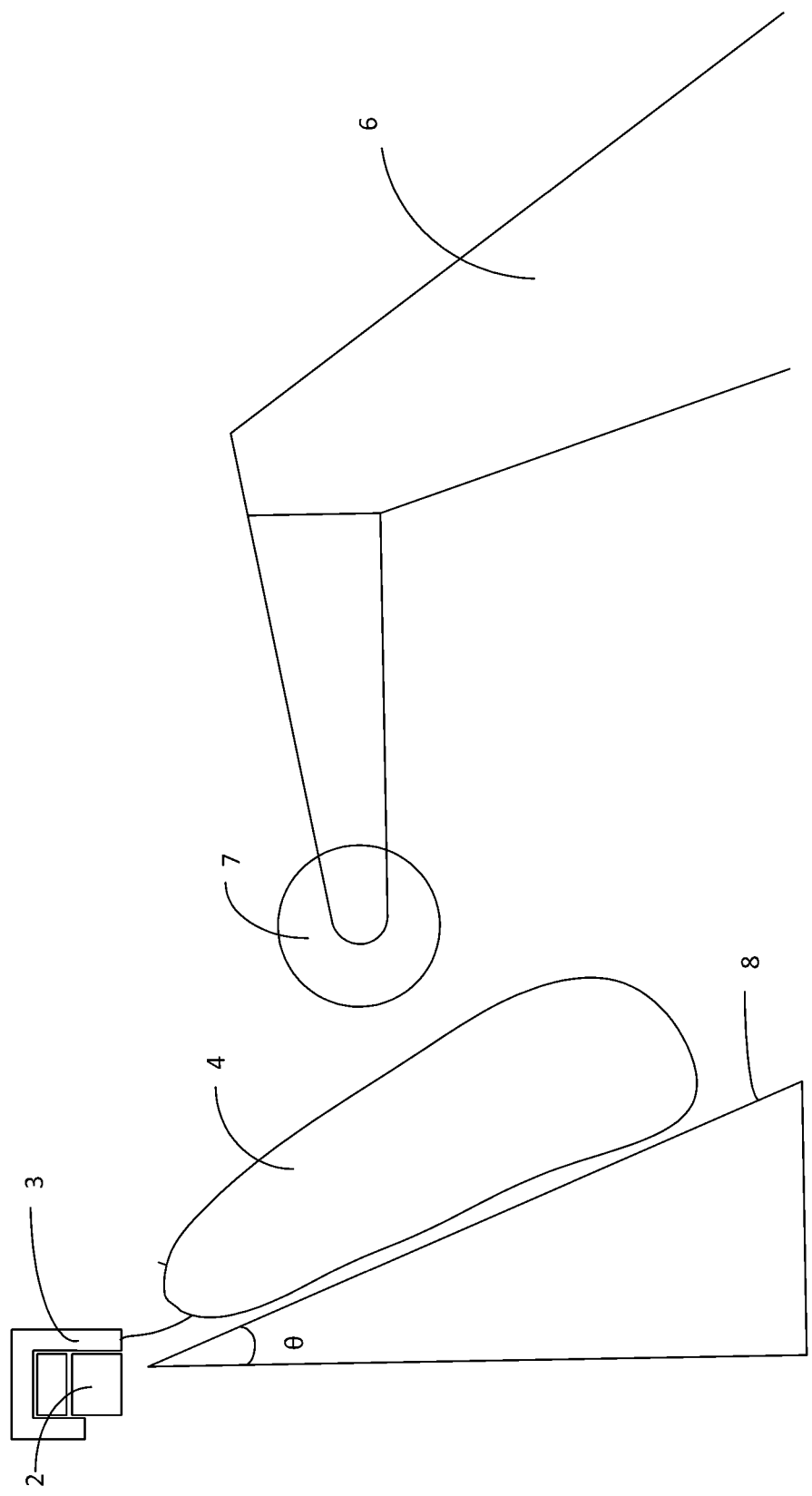
FIG. 2 is an end view of the carcass processing system shown in FIG. 1.

Referring now to FIG. 2 it will be seen that belt 8 is inclined at an angle θ to the vertical, which may suitably be between 5 to 40 degrees, with about 5 degrees being found adequate and requiring less support by the belt. Referring back to FIG. 1 a transition zone 9 is provided for the belt to move the carcass 4 from a vertical hanging position to the inclined orientation shown in FIG. 2. Due to the force of gravity upon the carcass it is forced against the inclined belt and this stabilizes the carcass. As the carcass now travels along a predictable path only the movement in the direction of the conveyor changes as the carcass moves (i.e. the swing element has been removed).

In operation a carcass 4 will be moved onto the transition zone 9 of the belt. Either pulleys 3 may be advanced by an automated system or the carcasses may be advanced manually. Once on the transition zone the carcass will be advanced along the conveyor through the transition zone until the carcass is on the inclined section of the belt 8 (see FIG. 2). The carcass is next advanced to a position in front of the imaging device 5, which may suitably be an X-ray imaging system, an optical camera, a laser scanner (i.e. a system projecting structured light and detecting the reflection with a camera to develop depth information), a time of flight camera or other suitable imaging systems.

During image capture the belt may stop to allow the imaging device 5 to capture one or more images. Alternatively, the belt 8 may continue to be driven and one or more images captured whilst the carcass is moving. In any case lateral and longitudinal swing has been removed and so the imaging information obtained will have a known correlation for the next cutting stage. The image information is provided to control system 10 which calculates the positions of required cuts.

Belt 8 is then driven to advance carcass 4 to a position in front of cutting tool 6. In this case the cutting tool is a robotic arm having a circular saw blade or circular knife 7 to perform the required cuts. Again cuts may either be performed whilst the belt is moving (with the robotic arm tracking the movement of the belt) or belt 8 may be stopped to allow the robotic arm to perform the cuts whilst the carcass is stationary. Control system 10 may calculate the position of belt 8 so that it knows the position of the carcass so that with the imaging information it can direct the robotic arm to perform the cuts whether moving or stationary. However, the cutting tool could additionally be fitted with a vision system to guide it to perform required cuts.

Figure 3:
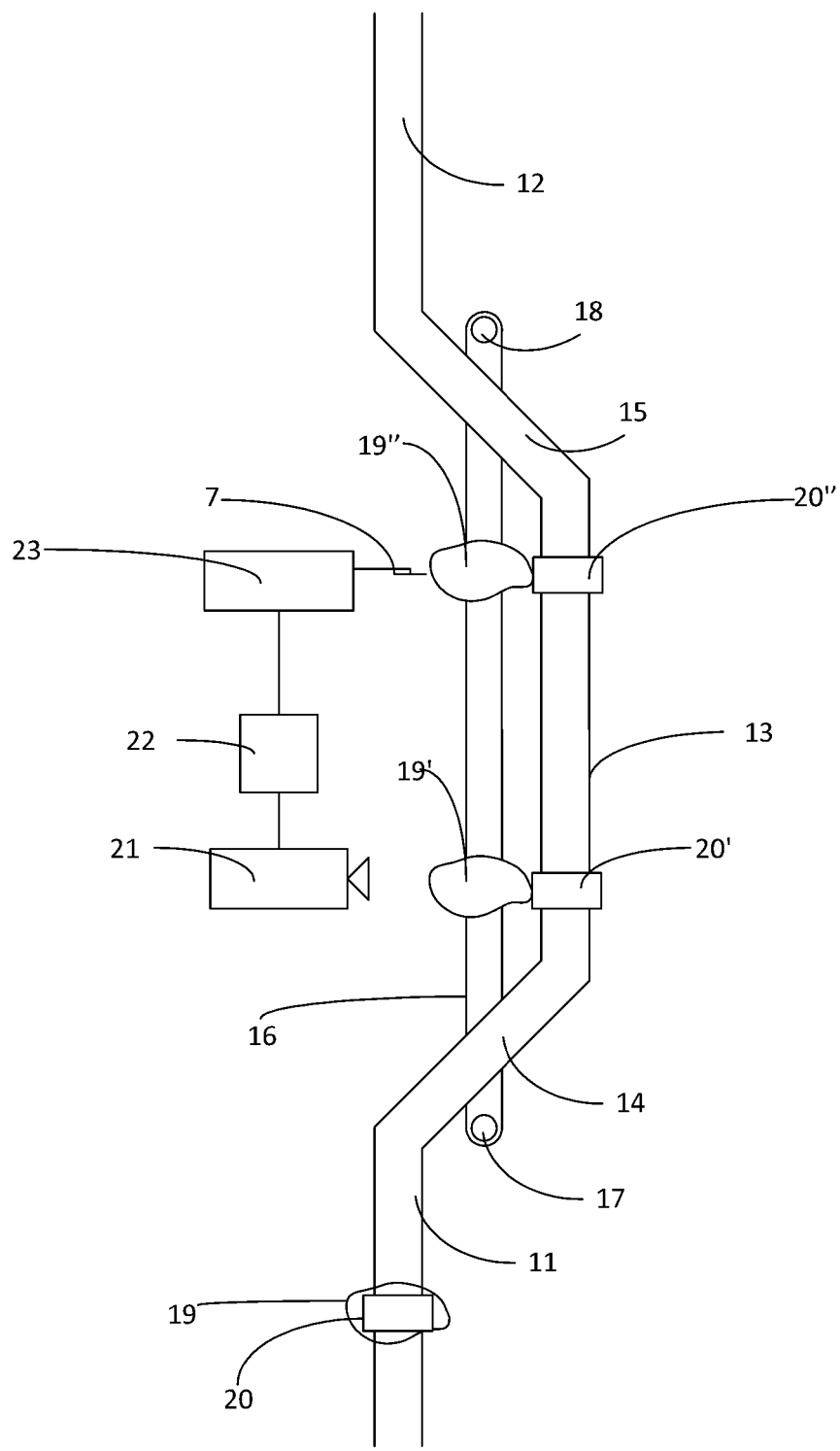
FIG. 3 is a plan view of a carcass processing system including an offset section of conveyor track.
Figure 4:
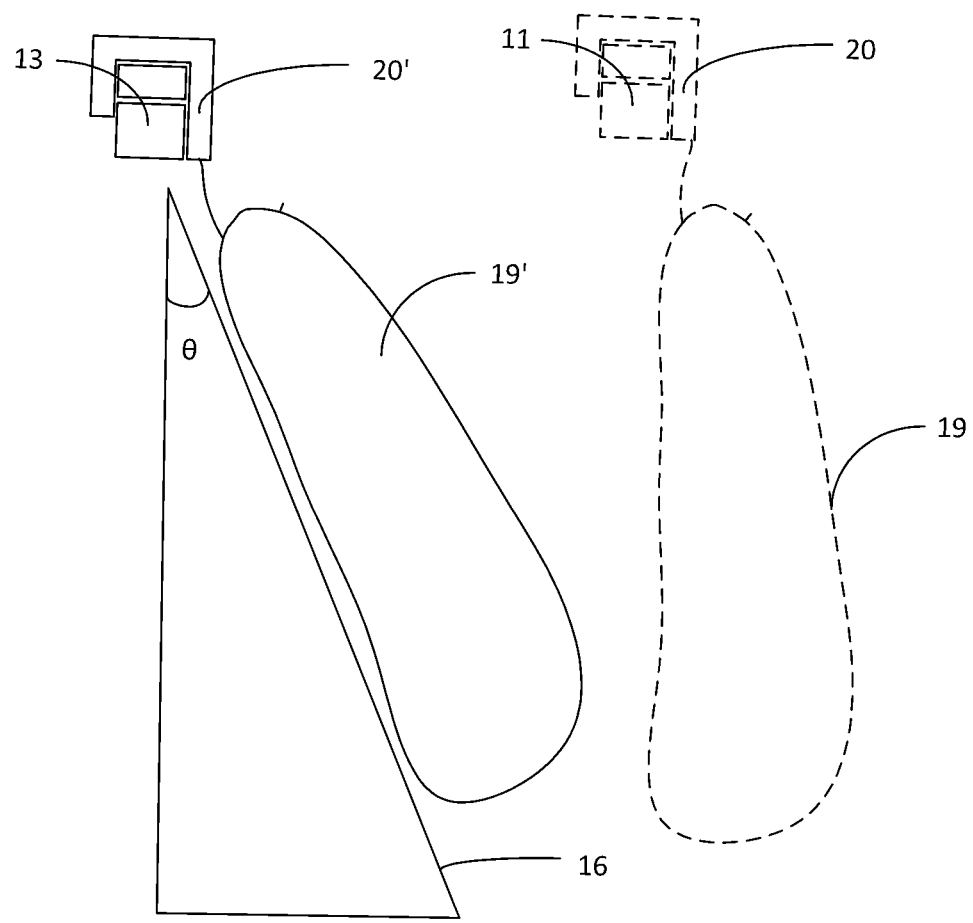
FIG. 4 is an end view of a carcass hanging next to the belt and away from the belt.

Referring now to FIGS. 3 and 4 an alternate design employing a laterally offset conveyor section will be described. The conveyor is seen to include main conveyor sections 11 and 12; a laterally offset section 13 that is laterally offset (in the horizontal plane) with respect to the main conveyor track sections 11 and 12 and transition sections 14 and 15 linking the ends of the offset track section 13 to the main conveyor track sections 11 and 12.

A continuous belt 16 rotates about rollers 17 and 18 and is positioned with respect to the conveyor so that a carcass 19 hanging from a pulley 20 enters along conveyor track 11 and is spaced away from belt 16. Whilst passing along track transition section 14 the carcass is brought into contact with belt 16 as indicated by carcass 19' on pulley 20'. This causes the carcass 19' to be held in an inclined orientation against belt 16 as shown in FIG. 4.

When the carcass is supported by belt 16 in the position indicated by 19' in FIG. 3 it may be scanned by imaging device 21. The imaging system be one or more of: an optical imaging system, an X-ray imaging system, a laser scanning camera, a time of flight camera and a Dual-energy X-ray absorptiometry system (DXA of DEXA system).

The imaging system may provide 2D, 3D or pseudo 3D (i.e. 2D with some depth information) image information to controller 22 which may calculate one or more cutting path based on the image information received from the imaging system 21. The controller 22 may also calculate the weight distribution of carcass portions based on the image information and the cutting paths. The controller may also receive weight information from a sensor measuring the weight of each carcass. Controller 22 provides the cutting paths to cutter 23 so that the cutting tool may perform cuts according to the one or more cutting path.

The operation of the system may be controlled by intelligence on the imaging/cutting side (i.e. dumb belt) or operation of the belt may be synchronized with the imaging and cutting systems.

For a "dumb belt" system the belt 16 may be continuously driven with imaging system 21 detecting the presence of a carcass in a required position and autonomously obtaining image information. The cutting tool 23 may include a vision system to locate the cutting tool relative to the carcass in a required position whilst performing the required cuts on a moving carcass.

Alternatively, the belt 16 may be controlled by controller 22 to position the carcass and pulley in a desired position (indicated at 19' and 20') in front of the imaging system 21 and stop for imaging and then move the carcass and pulley to the next desired position (indicated at 19" and 20") and stop for the cutting tool to effect the required cuts.

There is thus provided systems and methods for imaging and cutting which remove the problem of swing during imaging and cutting and allow these processes to be performed on a conventional conveyor line.

Although the above exemplary embodiment describes a system for both imaging and cutting it will be appreciated that the system may include only an imaging or a cutting stage.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A carcass cutting system comprising:
   a. a conveyor for conveying a carcass in a conveying direction, wherein the conveyor is adapted to hang the carcass from an upper end of the carcass;
   b. a belt positioned below the conveyor; and
   c. a cutting tool positioned to perform a cut whilst the carcass is against the belt;
      wherein a section of the belt opposite the cutting tool is angled to vertical from an upper edge of the belt to a lower edge of the belt, and wherein the belt is adapted to, when the carcass contacts the belt, displace a lower end of the carcass transverse to the conveying direction.

2. A carcass cutting system as claimed in claim 1 wherein the section of the belt opposite the cutting tool is inclined between 5 to 40 degrees to the vertical from the upper edge of the belt to the lower edge of the belt.

3. A carcass cutting system as claimed in claim 1 wherein the section of the belt opposite the cutting tool is inclined about 5 degrees to the vertical from the upper edge of the belt to the lower edge of the belt.

4. A carcass cutting system as claimed in claim 1 wherein the belt includes a transition zone in which the belt transitions the carcass from a freely hanging orientation to an inclined orientation.

5. A carcass cutting system as claimed in claim 1 wherein the conveyor includes a laterally offset section in the region of the belt.

6. A carcass cutting system as claimed in claim 5 wherein the conveyor includes main conveyor sections; an offset section that is laterally offset with respect to the main conveyor sections and transition sections linking the ends of the offset section to the main conveyor sections.

7. A carcass cutting system as claimed in claim 5 wherein the belt is in the form of a continuous belt driven about spaced apart rollers.

8. A carcass cutting system as claimed in claim 1 wherein the belt has a width of between 200 to 3000 mm.

9. A carcass cutting system as claimed claim 1 wherein the belt is driven in generally the conveying direction.

10. A carcass cutting system as claimed in claim 1 wherein the belt is stopped during cutting.

11. A carcass cutting system as claimed in claim 1 wherein the belt continues to move and the cutting tool moves with the belt during cutting.

12. A carcass cutting system as claimed in claim 1 including an imaging system positioned to capture an image of the carcass prior to cutting.

13. A carcass cutting system as claimed in claim 12 wherein the imaging system is selected from one or more of: an optical imaging system, an X-ray imaging system, a laser scanning camera, a time of flight camera and a Dual-energy X-ray absorptiometry system.

14. A carcass cutting system as claimed in claim 12 wherein the belt is stopped during imaging of the carcass.

15. A carcass cutting system as claimed in claim 13 including a controller which calculates one or more cutting path based on information received from the imaging system and controls the cutting tool to perform cuts according to the one or more cutting path.

16. A carcass imaging system comprising:
a. a conveyor for conveying a carcass in a conveying direction, wherein the conveyor is adapted to hang the carcass from an upper end of the carcass;
b. a belt positioned below the conveyor; and
c. an imaging device positioned to image the carcass whilst the carcass is against the belt;
wherein the belt opposite the imaging device is angled to vertical from an upper edge of the belt to a lower edge of the belt, and wherein the belt is adapted to, when the carcass contacts the belt, displace a lower end of the carcass transverse to the conveying direction.

17. A carcass imaging system as claimed in claim 16 wherein the belt is driven whilst the imaging device obtains an image of the carcass.

18. A carcass imaging system as claimed in claim 16 wherein the belt stops whilst the imaging device obtains an image of the carcass.

19. A carcass imaging system as claimed in claim 16 wherein the imagining device is selected from one or more of: an optical imaging system, an X-ray imaging system, a laser scanning camera, a time of flight camera and a Dual-energy X-ray absorptiometry system.

* * * * *